July 9, 1968    J. A. DICKIE ET AL    3,392,369
FLUID-ACTUATED, DUAL PISTON, UNDERWATER SOUND GENERATOR
Filed April 1, 1958    4 Sheets-Sheet 1
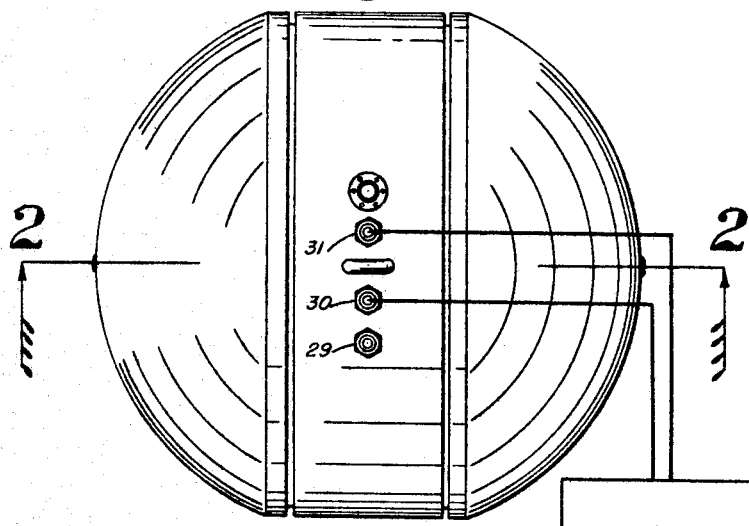
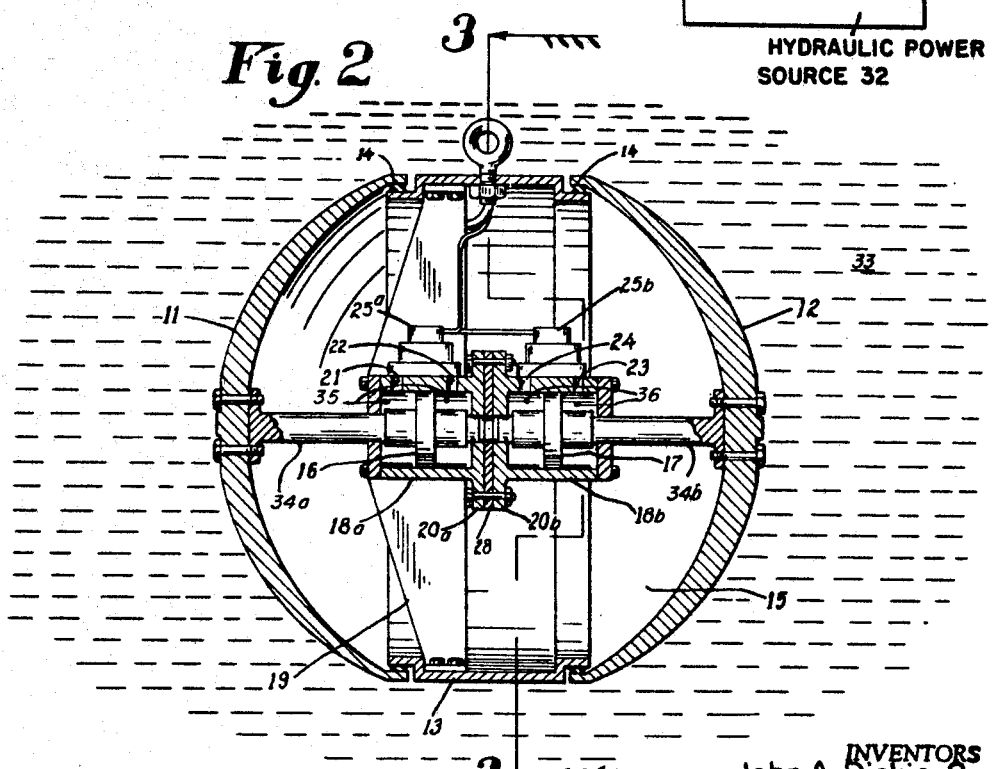
INVENTORS
John A. Dickie &
Theron Usher Jr.
BY
Howson and Howson
THEIR ATTORNEYS July 9, 1968 J. A. DICKIE ET AL 3,392,369

FLUID-ACTUATED, DUAL PISTON, UNDERWATER SOUND GENERATOR

Filed April 1, 1958 4 Sheets-Sheet 2

LOW PRESSURE RETURN — 21 OR 23
CONNECTION TO ACTUATOR PORT
HIGH PRESSURE INLET
CONNECTION TO ACTUATOR PORT — 22 OR 24

INVENTORS
John A. Dickie &
BY Theron Usher Jr.

Howson and Howson
THEIR ATTORNEYS

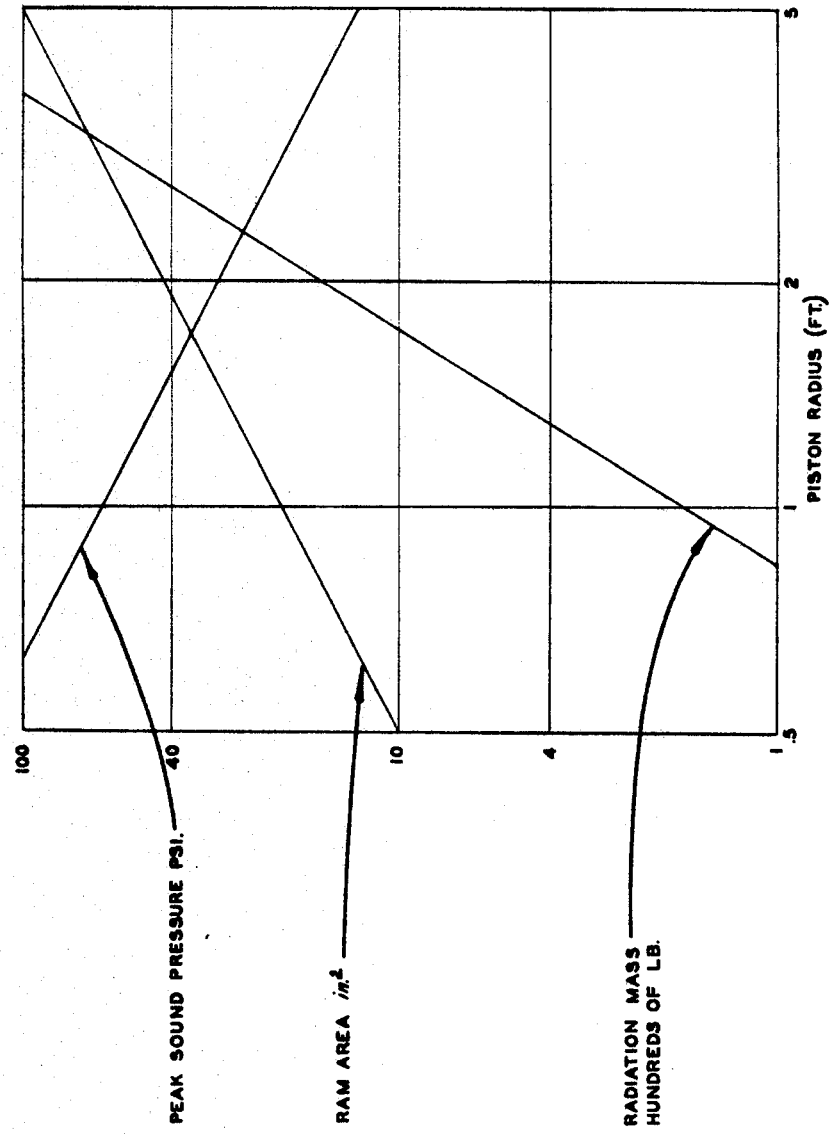

United States Patent Office 3,392,369
Patented July 9, 1968

3,392,369
FLUID-ACTUATED, DUAL PISTON, UNDER-
WATER SOUND GENERATOR
John A. Dickie, Hamden, and Theron Usher, Jr., North
Guilford, Conn., assignors, by mesne assignments, to
Textron Electronics, Inc., a corporation of Delaware
Continuation-in-part of application Ser. No. 672,423,
July 17, 1957. This application Apr. 1, 1958, Ser.
No. 725,628
18 Claims. (Cl. 340—12)

ABSTRACT OF THE DISCLOSURE

An underwater sound generator having two oppositely directed sound radiating pistons which are hydraulically driven.

*Related application*

This application is a continuation-in-part of our copending application, Ser. No. 672,423, filed July 17, 1957, titled Underwater Sound Source, and now abandoned.

This invention relates to transmitters for underwater sound signals and more particularly to a device adapted to increase the range over which the sounds can be transmitted. One of the limitations in sonar systems is the fact that the propagation losses of sound waves under the water create considerable limitation in the distances over which signals can be transmitted. Transmission losses in water are of two kinds. One is the divergence of the sound waves as they radiate from the source, thus distributing the energy over an ever increasing area. This is known as the spreading loss. The other main factor which causes decrease in intensity is the absorption of energy by the water and this is called the attenuation loss. It is a function of the frequency of the wave. The resultant effect of these two types of transmission loss determines in large part the range over which acceptable operation of any sonar system may be expected.

With present underwater sound equipment the attenuation properties of the water are too large for efficient signal propagation over long distances. The large attenuation factor is due primarily to the necessarily high operating frequencies of present day equipment. It has been found experimentally that the attenuation of sound in water decreases markedly as the frequency of operation decreases. However, present day equipment cannot radiate large amounts of power into the water at lower operating frequencies. It can be shown that the power radiated into the water is proportional to the square of the volume change of the transducer multiplied by the fourth power of frequency. The limitations of the present day equipment hinges on the fact that the large volume changes required at low frequencies to give high values of sound power cannot be obtained physically. Present equipment uses primarily piezoelectric and magnetostriction effects. Characteristically, these are not given to large displacements and have limitations in the force they can put out.

Until the present invention was made, no one knew how to adapt hydraulic power for efficient underwater sound propagation purposes. In the present invention, we have discovered how to achieve an efficient transfer of hydraulic power to acoustic power and thus obtain the large changes of volume necessary to radiate large amounts of acoustic power under water at low frequencies. Accomplishing this at low frequencies takes advantage of the resulting lower attenuation factors of the water so that long distance propagation may be achieved. Due to the low attenuation loss of sound waves under water at low frequencies, a greater amount of sound power can be detected at longer distances than could be detected for a source of equal power operating at high frequencies. Our invention utilizes fluid power to provide a controlled change of volume for the transmitter or transducer. Our transmitter couples the energy of the fluid power to the water with efficiency and permits easy control of the frequency of the waves and also control of the phase in a multiple head system.

In the drawings FIGURE 1 is a plan view of a transducer made according to our invention.

FIGURE 2 is a cross sectional view of the transducer taken along line 2—2 in FIGURE 1.

FIGURE 6 is a graph giving the parameters of the peak sound pressure, actuator ram area and the radiation mass plotted against the radius of the sound piston of apparatus in accordance with our invention.

Compression waves created in underwater sound transmission are generally sinusoidal in character. Any system which responds to a sinusoidally varying stimulus in such a manner as to be sinusoidal itself at the same frequency has a property known as impedance. Acoustic impedance has been defined as the ratio of the pressure to the volume velocity at a given surface in a sound transmitting medium. This impedance determines both the magnitude and phase of the response relative to the magnitude and phase of the stimulus.

Figure 4:
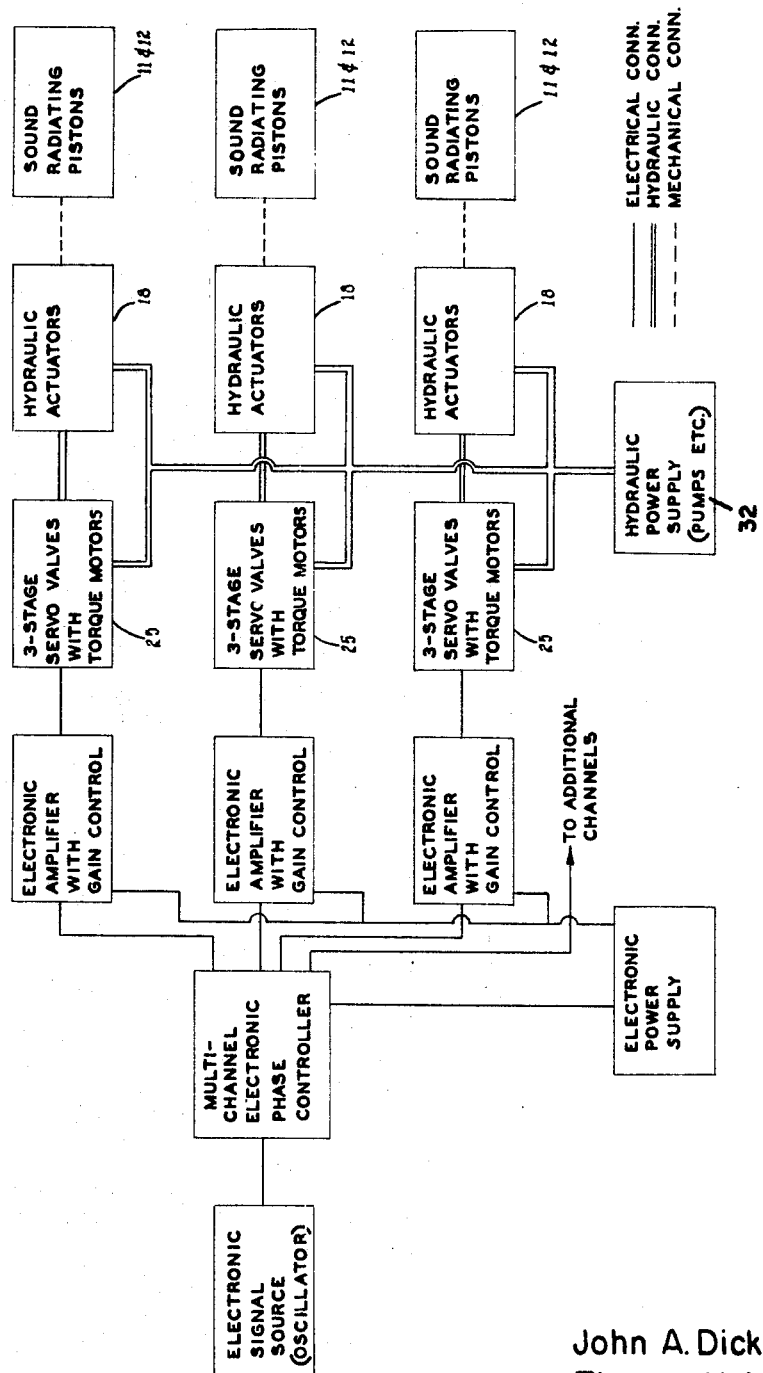
FIGURE 4 is a block diagram of a multiple head system in accordance with our invention.

In the drawings except FIG. 4 we have shown a single sound transmitter or transducer built in accordance with our invention. The transmitter here shown is adapted to operate at a fluid power pressure of 2,000 pounds per square inch at 200 cycles per second. This will radiate about 25 kw. of acoustic power into the water.

Figure 3:
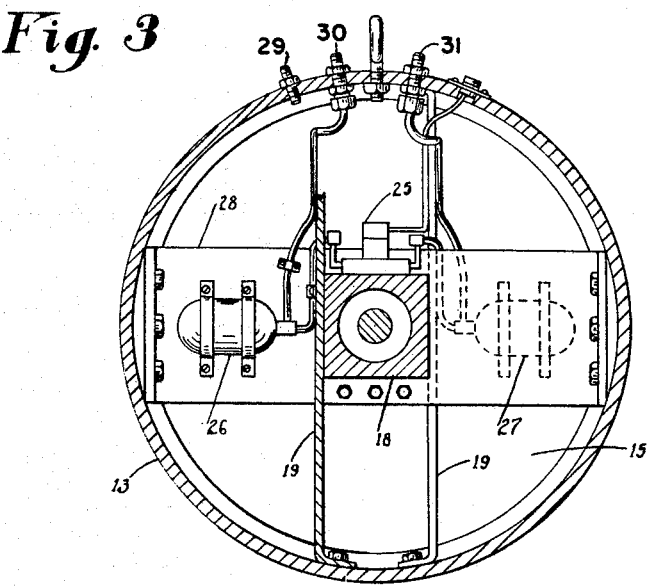
FIGURE 3 is a cross sectional view of the transducer taken along line 3—3 in FIGURE 2.

This transducer has two sound radiating pistons 11, 12, driven directly by hydraulic actuator means hereinafter described. They are arranged as a pair of oppositely, outwardly facing elements on opposite sides of a stationary housing 13 and are sealed to this housing by flexible rubber gaskets 14. Hydraulic actuator means are coupled to the sound radiating pistons 11, 12 by means of piston rods 34a, 34b, on the inside of the enclosure of which the pistons are a part. The actuator means are adapted to move each piston in a sinusoidal fashion, such that, with reference to FIGURE 2, each piston is moving in a direction opposite to that of the other at any particular time. The actuator means in this example are themselves enclosed so that there is free space inside the two pistons 11, 12, and the stationary housing 13. The pistons as shown are convex in shape or semi-spherical. As the pistons move out and the external volume of the transducer is changed, there is an identical change in the internal volume. We prefer to fill this internal space 15 with a gas under pressure, by means of the connection 29 (see FIGS. 1 and 3). The gas opposes the static forces of the water, 33, on the sound pistons, but offers negligible resistance to the dynamic forces created by the hydraulic driving system in spite of the fact that the gas is under pressure. Thus the presence of the gas inside the transducer is used to assist in holding the pistons 11, 12 in the proper mean position against the ambient water pressure. The accumulators 26, 27 on the inlet and discharge, respectively, absorb constant flow from and to the power source, 32, through connections 30, 31 to the transducer (FIGS. 1 and 3). This hydraulic power source may, for example, be an AC motor driving a fluid pump. The accumulators 26, 27 have sufficient springiness (gas volume) to present a substantially constant pressure to the actuator valves, 25a, 25b, in spite of the rapidly pulsating flow demands of the valves.

Turning now to the actuator means for each piston 11, 12, there is a ram 16, 17 fixed to the inside of the sound radiating piston, the head of each ram being located in a cylinder 18a, 18b. These cylinders lie horizontally within the enclosure formed by the radiating pistons 11, 12 and the stationary housing, and are supported on the inside of the housing by brackets 19, 28. The cylinders have adjacent central or inner end walls 20 and 20b bolted to and on opposite sides of the bracket 28. The two rams 16, 17 are thus on opposite sides of the central walls and bracket 28. Valve means hereinafter described are provided to cause reciprocation of the rams in their respective cylinders. Thus each cylinder and its ram can be considered as a separate hydraulic actuator.

Figure 5:
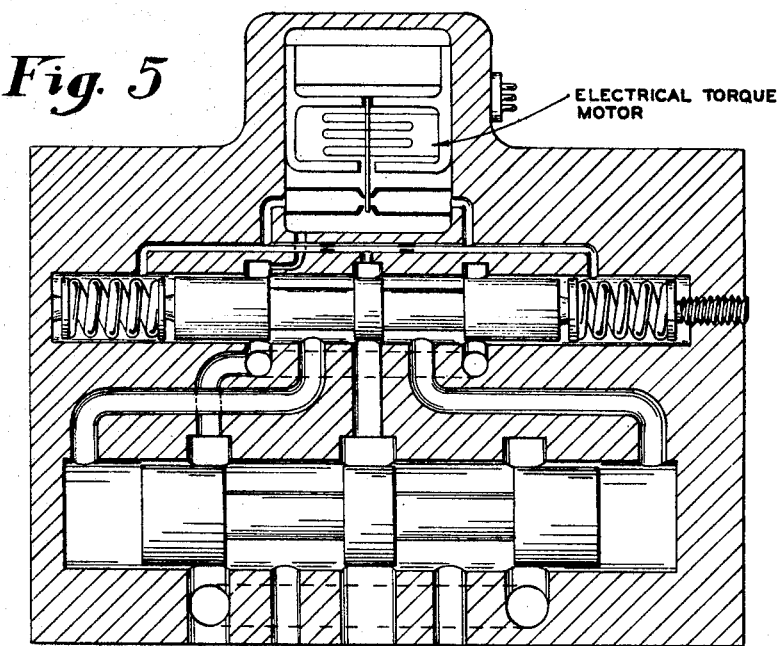
FIGURE 5 is a typical three stage servo valve such as used in our apparatus.

It will be observed that the area of each ram 16, 17 inside its cylinder 18a, 18b is much smaller than the area of the sound radiating piston 11, 12 to which it is connected. We use a high pressure across this relatively small ram to give the force transmitted to the hemispheres or pistons 11, 12 which are in contact with the water. Each hemisphere or piston 11, 12 has sufficient area to allow it to absorb the force generated by its ram without exceeding the maximum suction pressure allowed by water conditions and ambient pressure. These water conditions and ambient pressure are directly related to the pressure at which cavitation will occur. Oil or other fluid is supplied to the rams 16, 17 under controlled conditions hereinafter described. This may be by a four way valve system for each ram with a port into the actuator cylinder at each end of the space for each ram. In the drawings the ports for the left ram are 21, 22 and the ports for the right ram are shown at 23, 24. These ports for each ram connect to a four way spool valve 25a, or 25b such as shown in FIGURE 5. This preferably is an electronically controlled three stage servo valve with a four way power stage as shown in FIGURE 5. The oil between each port 21 and 22 or 23 and 24 on the one hand and the ram 16 or 17 on the other hand may be considered as constituting oil volume 35 or 36. The effective dimensions of the oil volume and the structures interconnecting the oil volume and the sound radiating pistons are important elements in obtaining a transducer of the best efficiency. By proper design of the oil volume 35 or 36 in each actuator and the interconnecting structures, the stiffness or springiness of the combination may be made to resonate with the structural mass 11, 12, 16, 17, 34a, 34b and associated mass of the water 33, at the operating frequency. In the particular embodiment of FIGURE 2, the interconnecting structures are the piston rods 34a, 34b, the seals 14, and the housing 13. In this particular embodiment the springiness of the interconnecting structures is concentrated mainly in the piston rods 34a, 34b.

While each oil volume is shown in the drawings in series with the interconnecting structure, the invention is equally applicable in embodiments in which the oil volumes are in parallel with the interconnecting structure and the oil volumes may be arranged in either of these two ways. An equivalent arrangement would use a two way spool valve connected to one end of the cylinder arranged to operate against an opposing spring; the spring could be a fluid or mechanical spring. In such an arrangement the spring would have sufficient stroke capability to maintain substantially constant force throughout the operating cycle. The springiness of the hydraulic volume and piston rod in the actuator so adjusted results in a system in which the over-all power factor is unity in spite of the fact that the small size of the piston tends to make its acoustic power factor rather poor. In further explanation, it can be stated that the structural mass referred to consists of the mass of the actuator rams 16, 17 and the rod connecting each ram to its sound radiating piston 34a, 34b and the sound pistons 11, 12. The effective water mass or the acoustic mass above referred to has been roughly shown to be the weight of the water 33 having a cross-secitonal area equal to that of the sound radiating pistons 11, 12 and a depth of roughly one-half the diameter of a sound piston. By thus feeding the hydraulic fluid to both sides of each ram 16, 17 and governing the design of the oil volumes 35, 36 and the piston rods 34a, 34b in each case, resonance is obtained at the desired operating frequency such as 200 cycles per second. The ram and piston are a relatively minor factor in obtaining resonance as far as concerns their mass although they are of primary importance as far as concerns their springiness. The desired stiffness of the system can be obtained by appropriate design of the magnitude of the oil volumes 35, 36 in the cylinders and the length and cross-sectional area of the piston rods 34a, 34b. Thus, by the above means, the resonance frequency of the transducer may be predetermined.

When the effective stiffness of the oil volume 35, 36 and the piston rods 34a, 34b is thus made to resonate with the structural mass and associated water mass at the operating frequency, we not only have a system in which the power factor is unity as above mentioned, but we have a transducer which is smaller than would otherwise be possible for the amount of acoustic power being transmitted.

Under resonance conditions as described above, the sinusoidal volume flow rate per unit time of the fluid required at the in-put ports of each actuator is smaller than the sinusoidal flow rate occurring at the face of the rams 16, 17 of the actuator. The sinusoidal velocity of the rams 16, 17 is also much less than the velocity of the pistons 11, 12 due to the resonance condition. The high velocity at the pistons 11, 12 is required to produce the high sound or acoustic power just mentioned. If this resonance condition were not employed, much higher flow rates would be required at the hydraulic actuator ports 21, 22, 23, 24 and it would be difficult to employ commercial valving equipment for this work.

It has been found that to operate in water at 200 cycles per second without surface effect, it is necessary to submerge the transducer 150 feet below the surface. At this depth one can pull only 50 pounds per square inch without causing cavitation and the formation of gases. Thus, in this example, where it is proposed to operate at at least 2,000 pounds per square inch across each ram 16, 17, i.e., on the power fluid side, it is necessary to distribute the force of the piston over at least fifty times as much area where the power is delivered to the water in order not to exceed the 50 pounds per square inch at the water 33. In this way we do not exceed the maximum suction pressure allowed by water conditions and also the hydraulic force at the rams 16, 17 and the acoustic forces at the pistons 11, 12 are properly matched and cavitation is avoided.

As the operating frequency of sonar equipment has been decreased, there has been a marked tendency to keep the flat plate diameter up to one-half the wave length. At 200 cycles per second the one-half wave length would be approximately 12½ feet in diameter. One of the principles of this invention is that the resonance condition causes a unity hydraulic power factor at the in-put ports 21, 22, 23, 24 to the actuators, even though the acoustic power factor at the pistons 11, 12 is rather poor. The resonance condition, which is merely a method of power factor correction, allows a much smaller piston to be used.

Hydraulic fluid from the power supply 32 is fed into the inlet connection 30. The servo valves 25a, 25b receive a signal from the electronic amplifier to which they respond to allow this fluid to flow into either the inboard or outboard ends of cylinders 18a and 18b. When the fluid is flowing into either inboard or outboard end, the opposing end is connected to discharge 31. As these flow rates are pulsating, the accumulators 26, 27 are added to the inlet and outlet lines respectively, to absorb the variance in flow and thereby maintain substantially constant pressure to the inlet and return ports of the valve.

It should also be noted that the transducer above described is very well suited for use in a multiple head system. An example is shown in FIGURE 4. By having electrically controlled valves which allow infinite phase control of one head or transducer relative to another, the phase relationship of the fluid flow to each transducer compared to the other transducers can be controlled. This gives directional sensitivity to the sound waves of a multiple transducer source made in accordance with the invention.

It will be noted that according to applicants' invention, the magnitude of the power which can be transferred to the water is not limited. The electronic controls in FIGURE 4 are simple and the source which applicants have invented is capable of use in any desired manner. The concept of the invention also provides means of so handling impedance of the fluid power that the generation of gas and cavitation is avoided in spite of the use of high pressures on the fluid power side. The energy transfer ratio and the available stroke are also favorable.

What is claimed is:

1. In an underwater sound source a transducer comprising a fluid tight housing having rigid wall portions including oppositely directed sound-radiating pistons, hydraulic actuator means within said housing mechanically coupled to said pistons for imparting reciprocating motion thereto, a source of hydraulic power, valving equipment within said housing coupling said source of power to said actuator means, and means for controlling said valving equipment so as to cause reciprocation of said pistons in unison alternately outwardly and inwardly relative to the interior of the housing thereby varying the instantaneous volume of said housing.

2. An underwater sound source according to claim 1, wherein said means for controlling the valving equipment includes electro-mechanical means coupled thereto and responsive to a controlling electrical input signal for determining the frequency and power of the sound output.

3. An underwater sound source according to claim 1, wherein said actuator means comprises a ram coupled to each piston and dimensioned relative to the associated piston in the light of the maximum pressure obtainable from said source of hydraulic power so as to develop the maximum permissible pressure on the face of the piston without causing cavitation when the transducer is submerged at normal operating depth.

4. An underwater sound source according to claim 1, wherein said actuator means comprises a ram coupled to each piston and wherein said valving equipment couples said source of hydraulic power to each ram, the volume of hydraulic fluid maintained between the valving equipment and each ram being proportioned along with the remainder of the moving system taking into account the normally associated acoustic water mass such that the moving system including said water mass is at least approximately resonant at the desired operating frequency.

5. An underwater sound source according to claim 1, further comprising means for maintaining the interior of said housing under gaseous pressure sufficient to oppose the static water pressure while offering negligible resistance to the dynamic forces.

6. An underwater sound source according to claim 1, wherein said actuator means comprises a double acting ram coupled to each piston and wherein said valving equipment couples said source of hydraulic power reciprocally to both sides of each ram, the volume of hydraulic fluid confined between the valving equipment and each ram remaining substantially constant at a magnitude proportioned along with the remainder of the moving system taking into account the normally associated acoustic water mass such that the moving system including said water mass is at least approximately resonant at the desired operating frequency.

7. In an underwater sound source a transducer comprising a fluid tight housing having rigid wall portions including a stationary portion and two convex sound-radiating pistons arranged as a pair of oppositely, outwardly facing elements on opposite sides of said stationary portion in combination with flexible gaskets sealing the pistons to the stationary portion, hydraulic actuator means within said housing mechanically coupled to said pistons for imparting reciprocating motion thereto, a source of hydraulic power, valving equipment within said housing coupling said source of power to said actuator means, and means for controlling said valving equipment so as to cause reciprocation of said pistons in unison alternately outwardly and inwardly relative to the interior of the housing thereby varying the instantaneous volume of said housing.

8. In an underwater sound source a plurality of transducers constituting a multiple head radiator, each transducer being omnidirectional and comprisng a fluid tight housing having rigid wall portions including oppositely directed sound-radiating pistons, hydraulic actuator means within said housing mechanically coupled to said pistons for imparting reciprocating motion thereto, a source of hydraulic power, valving equipment within said housing coupling said source of power to said actuator means, electro-mechanical means for controlling said valving equipment so as to cause reciprocation of said pistons in unison alternately outwardly and inwardly relative to the interior of the housing thereby varying the instantaneous volume of said housing and a source of plural signals of the same frequency but independently variable phase, each of said signals being coupled to the electro-mechanical means in a different transducer such that the sound radiation pattern from said multiple head radiator is a function of the phase relation between said signals.

9. In an underwater sound source a transducer comprising a fluid tight housing having rigid wall portions including oppositely directed sound-radiating pistons, fluid driven actuator means within said housing mechanically coupled to said pistons for imparting reciprocating motion thereto, a source of fluid power, valving equipment within said housing coupling said source of power to said actuator means, and means for controlling said valving equipment so as to cause reciprocation of said pistons in unison alternately outwardly and inwardly relative to the interior of the housing thereby varying the instantaneous volume of said housing.

10. In an apparatus for generating acoustic wave energy in water, the combination of a free-piston engine device, support means carrying said free-piston engine device and by which the same can be supported in a submerged position, said free-piston engine device comprising piston means and cylinder means, one of said means being reciprocatory during operation of said engine device when the same is supported in said submerged position by said support means, a rigid energy generating member, means rigidly interconnecting said generating member and said one reciprocatory means, and means for operating said free-piston engine device in such submerged position.

11. In an apparatus for generating acoustic wave energy in water, the combination of two substantially rigid energy generating members, support means carrying said members and by which said members can be supported in a submerged position, said members being mounted for reciprocatory movement in contact with the water, and engine means disposed between said members and operatively connected thereto to periodically drive said members simultaneously away from each other against the hydrostatic pressure applied to said members by the water.

12. Apparatus in accordance with claim 11, and wherein said engine means is a free-piston engine having a pair of opposed pistons, said pistons each being operatively connected to a different one of said energy generating members.

13. In a submersible apparatus for generating acoustic wave energy in water, the combination of an energy generating member mounted for reciprocatory movement and disposed to contact the water, drive means connected to said member and by which the same can be reciprocated, and power means connected to said drive means and operative to positively reciprocate said member at a predetermined low frequency to generate in the water acoustic wave energy which is at a high power level and which has said predetermined low frequency.

14. In an underwater sound source a transducer comprising a fluid tight housing having rigid wall portions including oppositely directed sound-radiating pistons, hydraulic acuator means within said housing mechanically coupled to said pistons for imparting reciprocating motion thereto, a source of hydraulic power, valving equipment coupling said sounrce of power to said actuator means, and means for controlling said valving equipment so as to cause reciprocation of said pistons in unison alternately outwardly and inwardly relative to the interior of the housing thereby varying the instantaneous volume of said housing.

15. An underwater sound source according to claim 14, wherein said means for controlling the valving equipment includes electro-mechanical means coupled thereto and responsive to a controlling electrical input signal for determining the frequency and power of the sound output.

16. An underwater sound source according to claim 14, further comprising means for maintaining the interior of said housing under gaseous pressure sufficient to oppose the static water pressure while offering negligible resistance to the dynamic forces.

17. In an underwater sound source a transducer comprising a fluid tight housing having rigid wall portions including a stationary portion and two sound-radiating pistons arranged as a pair of oppositely, outwardly facing elements on opposite sides of said stationary portion in combination with flexible gaskets sealing the pistons to the stationary portion, hydraulic actuator means within said housing mechanically coupled to said pistons for imparting reciprocating motion thereto, a source of hydraulic power, valving equipment coupling said source of power to said actuator means, and means for controlling said valving equipment so as to cause reciprocation of said pistons in unison alternately outwardly and inwardly relative to the interior of the housing thereby varying the instantaneous volume of said housing.

18. In an underwater sound source a transducer comprising a fluid tight housing having rigid wall portions including oppositely directed sound-radiating pistons, fluid driven actuator means within said housing mechanically coupled to said pistons for imparting reciprocating motion thereto, a source of fluid power, valving equipment coupling said source of power to said actuator means, and means for controlling said valving equipment so as to cause reciprocation of said pistons in unison alternately outwardly and inwardly relative to the interior of the housing thereby varying the instantaneous volume of said housing.

References Cited
UNITED STATES PATENTS

| | | | |
|---|---|---|---|
| 1,690,177 | 11/1928 | Peterson | 116—142 |
| 1,692,766 | 11/1928 | Anderson | 116—142 |
| 1,747,049 | 2/1930 | Campbell | 116—142 |
| 1,776,252 | 9/1930 | Farmer | 116—142 |
| 2,081,619 | 5/1937 | Ebert | 340—8 |
| 2,142,221 | 1/1939 | Stevens et al. | 116—142 |
| 2,172,066 | 9/1939 | Logsdon | 340—5 X |
| 2,424,357 | 7/1947 | Horsley. | |

RICHARD A. FARLEY, *Primary Examiner.*

FREDERICK M. STRADER, CHESTER L. JUSTICE, RODNEY D. BENNETT, *Examiners.*

C. F. ROBERTS, L. H. MYERS, *Assistant Examiners.*